July 15, 1958 — A. WITTLIN — 2,843,078
FLUID INDICATOR
Filed July 25, 1956
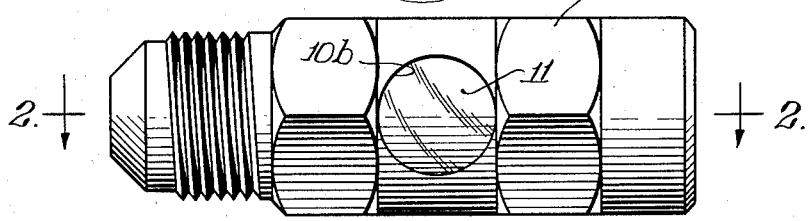
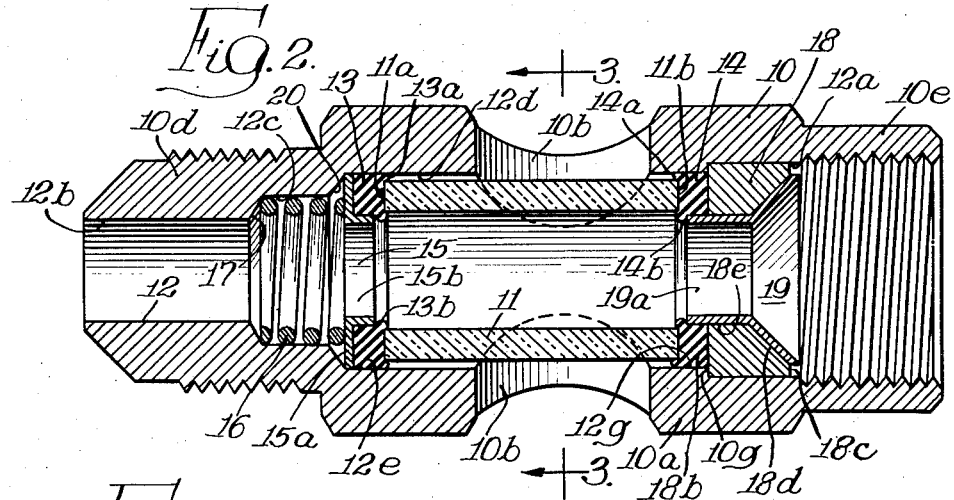
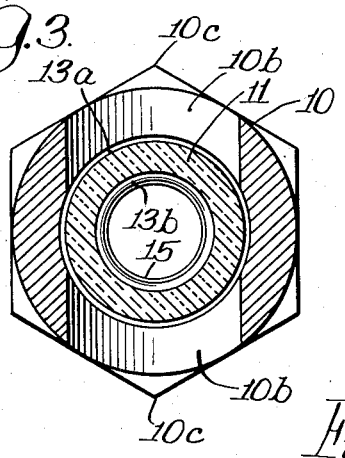
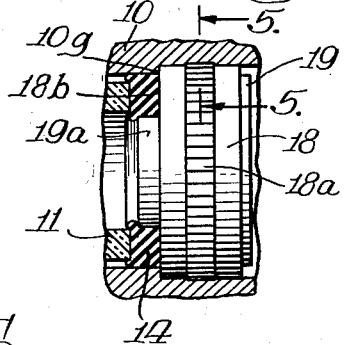
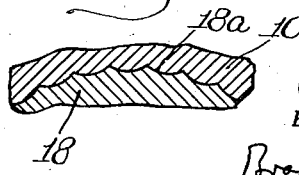
INVENTOR.
Albert Wittlin,
BY Schroeder, Hofgren,
Brady & Wegner Attys.

United States Patent Office 2,843,078
Patented July 15, 1958

2,843,078

FLUID INDICATOR

Albert Wittlin, Chicago, Ill.

Application July 25, 1956, Serial No. 599,941

4 Claims. (Cl. 116—117)

This invention relates to a fluid indicator.

The fluid indicator of this invention is of compact design and is constructed of a relatively small number of parts. The indicator includes, in general, a transparent tube, a surrounding protective member of generally tubular shape having a port or opening therein for viewing the transparent tube, a sealing gasket at each end of the transparent tube each making sealing contact with its respective tube end and with the adjacent inner surface of the protective member, and a gasket retaining member within the protective member at an end of the transparent tube engaging the inner surface of the protective member and one of the gaskets for retaining the gasket in place.

The invention will be described in conjunction with the accompanying drawings, of which:

Figure 1 is a side elevational view of one embodiment of the invention;

Figure 2 is a longitudinal section taken substantially along line 2—2 of Figure 1;

Figure 3 is a transverse section taken substantially along line 3—3 of Figure 2;

Figure 4 is a detail partially in section and partially in elevation showing a portion of the indicator including a gasket retaining member and associated structure; and Figure 5 is a fragmentary sectional elevation taken substantially along line 5—5 of Figure 4.

The embodiment of the invention shown in the accompanying drawings comprises a generally tubular protective member 10 having a central portion 10a of generally hexagonal cross-section and containing a pair of diametrically opposite viewing ports 10b for viewing an internal transparent tube 11 so as to observe the contents of the tube when the indicator is in operation. The ports 10b in the embodiment shown are formed by drilling diametrically opposite holes through the body 10a at two apexes 10c of adjacent sides of the hexagon.

The protective member 10 is of generally tubular shape in that it has an internal bore 12 extending from end to end. One end 10d of the protective member is threaded for connection to a pipe fitting. The other end 10e is provided with an enlarged inner chamber 12a as a part of the internal bore 12, and this chamber is internally threaded to receive a similarly threaded male fitting. The opposite end of the bore 12 is of reduced diameter as indicated at 12b. Adjacent to this end 12b of the bore is another section 12c of a diameter somewhat larger than that of the end 12b. Adjacent to section 12c is another section 12d of the internal bore that has an internal diameter larger than that of the section 12c, but smaller than that of the section 12a.

Located within the section 12d, which also contains the ports 10b, is the transparent tube 11 which is substantially concentric with the protective member 10. This tube is provided with end surfaces 11a and 11b located on opposite sides of the ports 10b. Bearing against the end surface 11a and against the adjacent surface portion of the internal bore 12 is an annular gasket 13 preferably made of synthetic rubber, such as neoprene. Bearing against the other tube surface 11b and the adjacent inner surface portion of the internal bore 12 is a similar gasket 14, also preferably made of a resilient material such as neoprene.

Positioned against the side of the first gasket 13 that is opposite to the transparent tube surface 11a is a gasket retainer 15. This gasket retainer has a substantially annular planar portion 15a bearing against the side of the gasket 13 opposite to the tube end 11a and a cylindrical portion 15b bearing against the inner surface of the gasket 13. Resilient yielding sealing pressure on the gasket 13 as well as on the gasket 14 is supplied by means of a single helical compression spring 16 located within the internal bore section 12c and having one end bearing against the gasket retainer portion 15a and the opposite end bearing against a sloped shoulder 17 that joins the bore portions 12b and 12c. The compressive pressure of the spring 16 on the gaskets 13 and 14 causes these gaskets to be held in sealing engagement with their end surfaces 11a and 11b of the transparent tube 11 and with the annular adjacent internal bore surfaces 12e and 12g, respectively. This compressive pressure of the spring 16 on the two gaskets causes a gasket portion 13a and a gasket portion 14a to be extruded slightly between the tube 11 and the bore surface 12d and also causes gasket portions 13b and 14b to be extruded around the inner surface edges of the ends 11a and 11b of the transparent tube. These extruded portions serve to space the transparent tube 11 from the internal bore surface of the protective member 10 and to hold the transparent tube in position out of contact with this bore surface.

The second gasket 14 is held in position by means of a gasket retaining member 18 frictionally fitted within the bore portion 12a at the end of the protective member 10 that is opposite to the spring 16. This retaining member 18 is positioned against an annular shoulder 10g on the inner surface or bore 12 of the protective member located at the inner end of the chamber 12a and an outer end of the bore section 12d. This shoulder serves to limit the inward movement of the retaining member 18 when the retaining member is pressed into position.

The retaining member 18 is preferably held in position within the bore chamber 12a by a frictional press fit. In order to make this fit secure, the outer surface of the retaining member 18 is provided with an annular band 18a, illustrated most clearly in Figures 4 and 5, with this annular band being knurled in order to dig into the inner surface of the protective member 10 and lock the retaining member in place.

As can be seen in the drawings, the inner end 18b of the retaining member 18 is flat and bears against the second gasket 14 so as to hold this gasket in place. The outer end surface 18c is also of flat, annular shape, but is considerably narrower than the annular end 18b. The internal surface of the retaining member 18 is in two portions, with the first portion 18d at the outer end of the retaining member being in the form of a right-angled truncated cone that is inwardly and rearwardly tapered and the second portion 18e being essentially cylindrical and joined to the tapered portion 18d to form a generally funnel-like surface.

Fitted within the inner surface portions 18d and 18e of the retaining member 18 and held therein preferably by friction is a soft, generally tubular sealing member 19 preferably of a soft metal such as copper. This sealing member 19, which is also of funnel shape similar to the shape of the surfaces 18d and 18e, is of a size as to fit snugly against the surfaces 18d and 18e. The inner end 19a of the member 19 extends inwardly of the inner surface 18b of the retaining member 18 so as to form a tubular extension. This tubular extension 19a serves as a retaining member for the inner side of the gasket 14 similar to the cylindrical portion 15b of the retainer 15 that is used with the other gasket 13. The extruded portion 14b of the gasket 14 is located between the inner end surface of this tubular extension 19a and the adjacent corner of the transparent tube 11.

Because the transparent tube 11 is essentially free-floating on the gaskets 13 and 14, only a single spring 16 is required to apply sealing pressure to both the gaskets. Another important advantage of this construction is that the gasket retaining member 18, sealing member 19, and second gasket 14 can be assembled as a sub-assembly outside of the protective member 10, with the gasket 14 retained on the surface 18b and around the tubular extension 19a by the elasticity and friction of the gasket 14 which has a normal internal diameter slightly less than the external diameter of the extension 19a. This sub-assembly may then be pressed into place after the spring 16, gasket retainer 15, first gasket 13, and transparent tube 11 have been positioned within the protective member 10 in the order named through the open end 10e. When this sub-assembly is assembled outside of the protective member 10, it is then pressed in the position shown in the drawings, with the second gasket 14 bearing against the adjacent end of the transparent tube 11. As previously described, the shoulder 10g within the protective member serves as an inner stop for the sub-assembly.

The sealing member 19, which is preferably of copper, serves as a built-in sealing gasket for sealing the tapered inner end of a male pipe fitting (not shown) that is tapered similarly to the surface 18d. The fitting which is of usual construction is threaded and is normally held within the threaded end 10e of the indicator when the indicator is in use.

An important provision of the invention is in having the successive bore sections 12b, 12c, 12d, and 12a of increasing diameter in the order named. This aids in the assembly of the indicator. Thus, the sloped shoulder 17 acts as a retaining stop for the spring 16, the sloped shoulder 20 between the bore sections 12c and 12d acts as a stop for the gasket retainer 15, and the shoulder or corner 10g between the bore sections 12d and 12a acts as a stop for the gasket retainer member sub-assembly 18 and 19.

In the invention as illustrated, the gaskets 13 and 14 provide a fluid-tight seal which prevents leakage of internal fluid to the atmosphere and leakage of air into the interior of the indicator. This indicator is preferably used in refrigerating systems in the refrigerant conduit lines, and it is necessary that an efficient seal be provided in order to prevent these leakages. Thus, the gasket 13 seals against the end of the transparent tube 11, which is preferably of glass, and also against the inner bore 12 of the protective member or indicator body 10. It also provides a floating resilient mounting for this end of the transparent tube. The other gasket 14 seals similarly to its end of the transparent tube 11 and to the protective member or housing 10. It is not necessary that the retaining member 18 form a fluid-tight seal with the housing 10 as, even if there is no such seal between these two members, the gasket 14 prevents any flow of fluid from the inside to the outside or from the outside to the inside. The gasket 14, like the gasket 13, also provides a resilient floating mounting for the transparent tube 11.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. An indicator conduit apparatus, comprising: a transparent tube; a surrounding protective member within which the tube is located containing a port through which the tube is viewable; a sealing gasket at each end of the tube making sealing contact with said end and with the adjacent inner surface of said protective member; a gasket retaining member of generally annular shape at one of said ends frictionally engaging the inner surface of the protective member and one of said gaskets for retaining the gasket in place, the retaining member having an inner surface inwardly and rearwardly tapered at its outer end portion and generally tubular at its inner end portion, the two portions describing a funnel-like shape; and a relatively soft generally tubular sealing member on said inner surface of the gasket retaining member and of essentially the same shape as said surface, the sealing member having an inner end extended inwardly of said retaining member and contacted by an inner surface of said gasket.

2. An indicator conduit apparatus, comprising: a transparent tube; a surrounding protective member within which the tube is located containing a port through which the tube is viewable; a sealing gasket at each end of the tube making sealing contact with said end and with the adjacent inner surface of said protective member; a gasket retaining member of generally annular shape at one of said ends engaging the inner surface of the protective member in a driven force fit and operatively engaging one of said gaskets for retaining the gasket in place; a relatively soft generally tubular sealing member on the inner surface of the gasket retaining member having the outer end of the sealing member modified to receive and make sealing contact with the inner end of a conduit fitting; and a resilient compression spring at the other of said ends applying compressive pressure to said gaskets.

3. An indicator conduit apparatus, comprising: a transparent tube; a surrounding protective member within which the tube is located containing a port through which the tube is viewable; a sealing gasket at each end of the tube making sealing contact with said end and with the adjacent inner surface of said protective member; a gasket retaining member of generally annular shape at one of said ends frictionally engaging the inner surface of the protective member and one of said gaskets for retaining the gasket in place, the retaining member having an inner surface inwardly and rearwardly tapered at its outer end portion and generally tubular at its inner end portion, the two portions describing a funnel-like shape; a relatively soft generally tubular sealing member on said inner surface of the gasket retaining member and of essentially the same shape as said surface, the sealing member having an inner end extended inwardly of said retaining member and contacted by an inner surface of said gasket; and a resilient compression spring at the other of said ends applying compressive pressure to said gaskets, the protective member having a chamber portion therein housing said spring.

4. An indicator conduit apparatus, comprising: a transparent tube; a surrounding protective member within which the tube is located containing a port through which the tube is viewable; a resilient sealing gasket at each end of the tube making sealing contact with said end and with the adjacent inner surface of said protective member; a gasket retaining member of generally annular shape at one of said ends engaging the inner surface of the protective members in a driven force fit and operatively engaging one of said gaskets for retaining the gasket in place; and a relatively soft generally tubular sealing member on the inner surface of the gasket retaining member having the outer end of the sealing member modified to receive and make sealing contact with the inner end of a conduit fitting.

References Cited in the file of this patent

UNITED STATES PATENTS

| | | |
|---|---|---|
| 2,714,868 | Franck | Aug. 9, 1955 |
| 2,725,844 | Wittlin | Dec. 6, 1955 |